(12) United States Patent
Seeliger

(10) Patent No.: US 6,665,018 B1
(45) Date of Patent: Dec. 16, 2003

(54) ARRANGEMENT FOR RETRIEVING DATA BITS OF A DATA SIGNAL

(75) Inventor: Rolf Seeliger, Pinneberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 430 days.

(21) Appl. No.: 09/722,805

(22) Filed: Nov. 27, 2000

(30) Foreign Application Priority Data

Nov. 26, 1999 (DE) .......................................... 199 56 937

(51) Int. Cl.$^7$ ................................................. H04N 7/00
(52) U.S. Cl. ....................................... 348/468; 348/465
(58) Field of Search ................................. 348/465, 468; 327/8, 2, 9, 45

(56) References Cited

U.S. PATENT DOCUMENTS 5,555,025 A    9/1996  McArthur .................... 348/478
5,657,088 A *  8/1997  Hankinson ................... 348/465
5,861,925 A *  1/1999  Fujitaka ...................... 348/465
5,901,181 A *  5/1999  LaGarde ...................... 375/317
6,005,632 A * 12/1999  Cahill, III .................... 348/465

* cited by examiner

Primary Examiner—Victor R. Kostak
(74) Attorney, Agent, or Firm—Daniel J. Piotrowski

(57) ABSTRACT

In retrieving data bits of a data signal in the form of digital sampling values on which the data bits are modulated asynchronously at a known modulation frequency, a system receives a phase signal supplying the phase position of the data bits of the sampled data signal relative to a predetermined starting point and determines the positions of the data bits from the phase signal and the known modulation frequency of the data bits. The system determines for each data bit to be retrieved whether its position is located around the position of a sampling value within a tolerance window of predetermined width. If so, the system uses the value of the sampling value within the tolerance window for retrieving The data bit. If not, the system uses both sampling values on both sides of the position of the data bit to be retrieved for retrieving the data bits.

16 Claims, 2 Drawing Sheets

ARRANGEMENT FOR RETRIEVING DATA BITS OF A DATA SIGNAL

BACKGROUND OF THE INVENTION

1. Field of the Invention

The invention relates to a system implementing a method for retrieving data bits of a data signal in the form of digital sampling values on which the data bits are modulated asynchronously at a known modulation frequency, the system receiving a phase signal supplying the phase position of the data bits of the sampled data signal relative to a predetermined starting point.

2. Description of the Related Art

A known data signal that includes data bits that are asynchronously modulated at a given modulation frequency may be, for example, a teletext signal. Such a teletext signal occurs in given picture lines of a video signal. It is true that its modulation frequency is known, but the phase position of the data bits of the teletext signal within the television lines is not known. This phase position may, however, be determined and generated in a corresponding phase signal that indicates the phase position of the data bits. Furthermore, it is assumed that the data signal, i.e., for example, the teletext signal, is present in a sampled form, i.e., in the form of individual digital sampling values.

A known system for decoding data in the vertical blanking interval, which conventionally occurs in television signals, is known from U.S. Pat. No. 5,555,025, in which the type of data in the signal the frequency and the phase position of this signal are determined in a relatively elaborate way. A clock is then generated, which is formed in such a way that the sampling of the analog data signal takes place in a synchronized form with respect to the phase position of the bits. In this case, the sampling frequency is thus oriented in accordance with the modulation frequency or the phase position of The data bits. This procedure is very elaborate and not very useful in many receiver concepts, because the sampling frequency must be varied and, as is normally useful and relatively simple, cannot be coupled either to the chrominance subcarrier frequency or to the line frequency of the video signal.

SUMMARY OF THE INVENTION

It is an object of the invention to provide a system that, on the one hand, does not require a coupling of the sampling frequency with the phase position and/or the modulation frequency of the data bits of the data signal and, on the other hand, requires a small number of component Moreover, at least elements of system should be realizable in software.

According to the invention, this object is solved in that the system determines the positions of the data bits to be retrieved from the phase signal and the known modulation frequency of the data bits, in that the system determines for each data bit to be retrieved whether its position is located around the position of a sampling value within a tolerance window of predetermined width, in that the system, if this should be the case, uses the value of the sampling value within the tolerance window for retrieving the data bit, and in that the system, in the case where the position of a data bit to be retrieved is not located around the position of a sampling value within a tolerance window, uses both sampling values on both sides of the position of the data bit to be retrieved for retrieving the data bit.

Since, on the one hand, the modulation frequency of the data bits is known and, on the other hand, the position of the data bits is known from the phase signal applied to the system, the position of every individual data bit can be determined therefrom. Thus, the system determines, from this information, those temporal positions at which data bits occur. The central position of a data bit is then each time concerned.

Since it is fundamentally assumed in the invention that the sampling frequency is not coupled with the modulation frequency of the data bits, it cannot be assumed that these positions of the data bits exactly correspond to the positions of the sampling values. Actually, there will even be a mutual drift of these positions so that a central position of a data bit is rather accidentally hit by the position of a sampling value.

Thus, there is problem of how to use suitable sampling values for the determined positions of the data bits. The system according to the invention solves this problem in that tolerance windows are used which are positioned around the positions of the sampling values. These tolerance windows may be chosen with a predetermined width, but they may also be variable.

For each data bit to be retrieved, and whose position was determined, it is now determined whether this position is located around the position of a sampling value within a tolerance window. When this is the case, it can be assumed that the value of the sampling value, whose tolerance window includes the data bit to be retrieved, closely approximates the actually desired value of The data bit. This is also possible because, based on the sinusoidal variation of such signals, the difference between these two values will be very small as they are in a range of a maximum or a minimum in which the variation of a sine curve is relatively flat.

When the position of a data bit to be retrieved is located around the position of a sampling value within the tolerance window, the value of this sampling value is used for determining the bits to be retrieved.

In the reverse case, in which the position of a data bit to be retrieved is not located around the position of a sampling value within a tolerance window, this possibility does not usefully and immediately exist. Instead, the two sampling values located on both sides of the position of the data bit to be retrieved are used for retrieving the data bit. These two sampling values will be relatively close to the value of the searched data bit to be retrieved and may therefore be usefully employed for determining the data bit to be retrieved. Based on the computed phase position, further samples between the original sampling values are referred to. The samples may be interpolated in a simple manner.

The essential advantage of this system according to the invention is that its mode of operation is very simple. Independent of the fact whether it is realized in hardware or software, the determination of the data bits to be retrieved or the determination of their value requires only a very small number of components, because sampling values which are present can either be directly taken over, or such a data bit to be retrieved is determined from two sampling values. The computation effort and the memory access are thus minimal. Moreover, the system does not impose any requirements on the selection of the sampling frequency, except of course compliance with the Nyquist criterion. It may be particularly uncoupled with all other frequencies, for example, with the modulation frequency. The system is thus very insensitive to disturbances and suitable for universal use.

One embodiment of the invention ensures that the two sampling values, which, as described above, are located on both sides of the position of the data bits to be retrieved, are used for retrieving the data bit in such a way that a new supporting value is formed in accordance with the phase position from the two sampling values, which supporting value is used as a value for the data bit to be retrieved and from which the data bit can be determined, all this in the case where the position of a data bit to be retrieved is not located around the position of a sampling value within a tolerance window. This requires a minimal computation effort because only additions and divisions by $2^n$ are required, in which the division by $2^n$ can be realized by means of a single shift in the binary system.

To further improve the detection security, a further embodiment of the invention provides adaptive clipping levels. These clipping levels are used to find the value of the data bits so as to recognize the data bits to be retrieved. When a given clipping level is exceeded, a logic first value is concerned and when the value falls below another clipping level, a logic second value is concerned. The adaptive implementation of the clipping level may be preferably oriented on the maximum amplitude of the sampling values. In this way, for example, possible DC drifts may be taken into account in the choice of the values for the clipping level.

In a further embodiment of the invention, the width of the tolerance bands can be advantageously formed adaptively, which width can be adjusted in dependence upon the desired detection security. When the data signal is of a type comprising an error correction, it can be determined with reference to the occurring errors in the evaluation of the detected data bits of the data signal how many errors are involved. Dependent on this error rate, the width of the tolerance band can be adjusted in such a way that, maximally, a desired error rate occurs.

These and other aspects of the invention are apparent from and will be elucidated with reference to the embodiments described hereinafter.

DETAILED DESCRIPTION OF THE PRESENTLY PREFERED EMBODIMENTS

Figure 1:
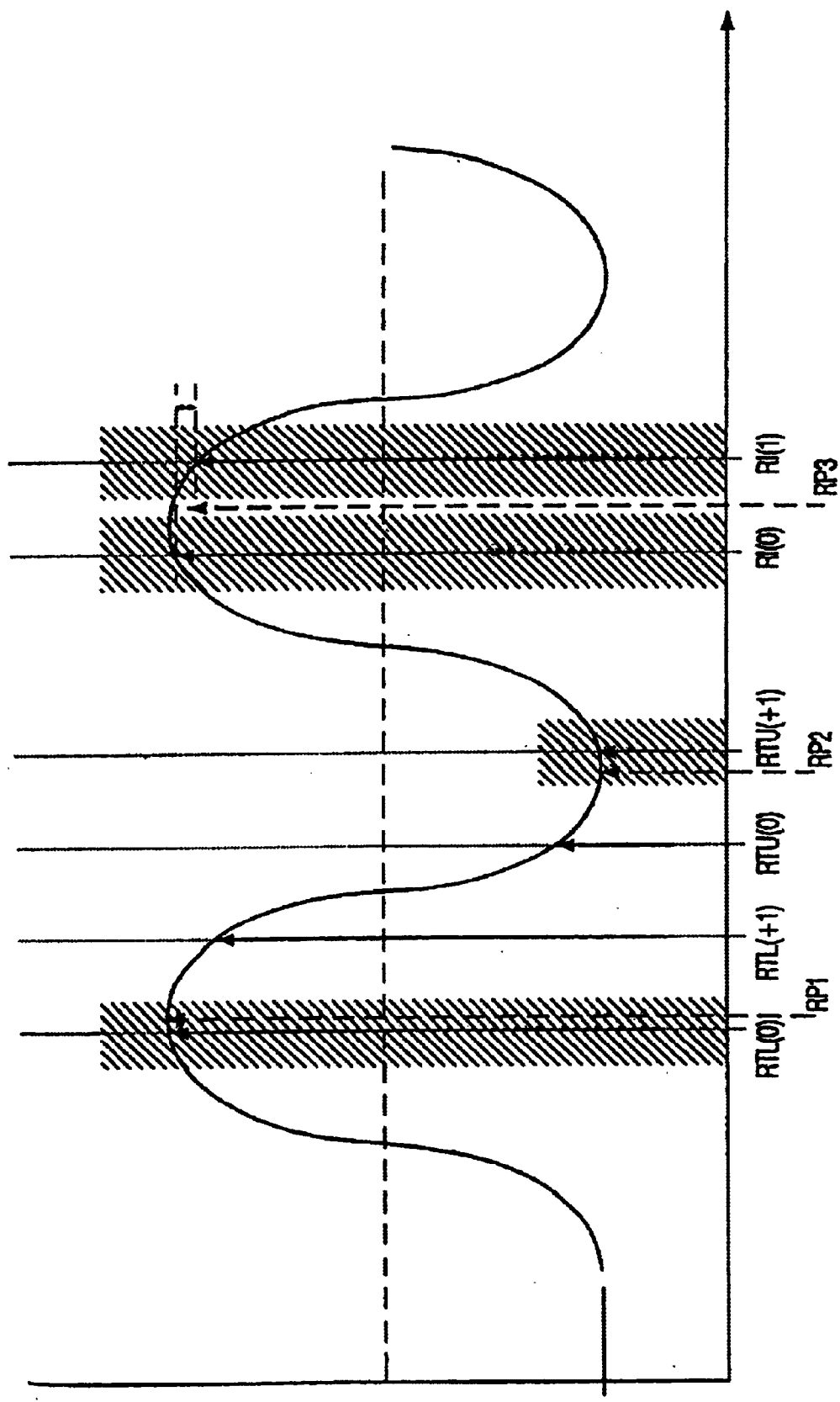
FIG. 1 shows, as a function of time, a data signal, some sampling values of the data signal and the computed bit positions of the bits to be retrieved.

FIG. 1 shows some characteristic curves of an analog data signal on which data bits have been asynchronously modulated. This analog data signal is sampled so that given sampling values, i.e., the sampling values RTL(0), RTL(+1), RTU(0), RTU(+1), RI(0) and RI(1) illustrated in FIG. 1 are obtained. Since the sampling frequency is not coupled with the modulation frequency of the data signal and should not be in a fixed ratio therewith, the positions of the sampling values relative to the positions of the data bits may be arbitrary or may be mutually shifted.

Thus, there is the problem which sampling values are to be used in which way for determining the data bits.

For the system according to the invention, it is assumed that the system receives a phase signal that indicates the phase position of the data bits in the data signal relative to an arbitrary known reference point. Since, moreover, the modulation frequency of the data signal is known, the system is relatively easily capable of determining the positions of the data bits. These positions are understood to mean the central position of each data bit. In FIG. 1, three positions of data bits are obtained for the relevant characteristic curve, which positions are denoted by RP1, RP2 and RP3 as illustrated in FIG. 1. These positions thus indicate the centers of the dam bits. These positions may also be understood to be virtual resampling points, because these positions would ideally be those positions at which there should ideally be a sampling value. However, instead of actually performing a resampling, which is very elaborate, the system according to the invention attempts to determine the values of the data bits RP1, RP2 and RP3 in a different way and as simply as possible.

To this end, the system ascertains, for each position of a data bit to be retrieved, whether this data bit is located around a real sampling value within a tolerance window. When this is the case, the sampling value, whose tolerance window includes the position of the bit to be retrieved, is used as a value for this bit to be retrieved.

In the example shown in FIG. 1, this is the case for the two first data bits shown. The position of the data bit RP1 to be retrieved is located around a sampling value within a tolerance window which is shaded in FIG. 1, namely around the real sampling value RTL(0). Thus, the sampling value RTL(0) is taken over as a value for the data bit to be retrieved.

The same applies to the data bit RP2 to be retrieved, which data bit is located around the sampling value RTU(+1) within a tolerance window, so that the value of the sampling value RTU(+1) is taken over for the data bit RP2 to be retrieved.

However, it may also occur that the position of a data bit to be retrieved is not located within a tolerance window of a sampling value. In this case, those two sampling values which are located on both sides of the position of the data bit to be retrieved are used for determining the value of the data bit to be retrieved.

Such an example is shown in FIG. 1 for the data bit RP3 to be retrieved. FIG. 1 shows that the position of the data bit RP3 to be retrieved is located within no tolerance window of a sampling value. Instead, it is located between the two sampling values RI(0) and RI(1). For determining the value of the data bit RP3 to be retrieved, these two sampling values, which are located on both sides of the position of the data bit RP3 to be retrieved, are used for determining this data bit. This may be advantageously realized in that a mean value is formed from the two sampling values RI(0) and RI(1).

Figure 2:
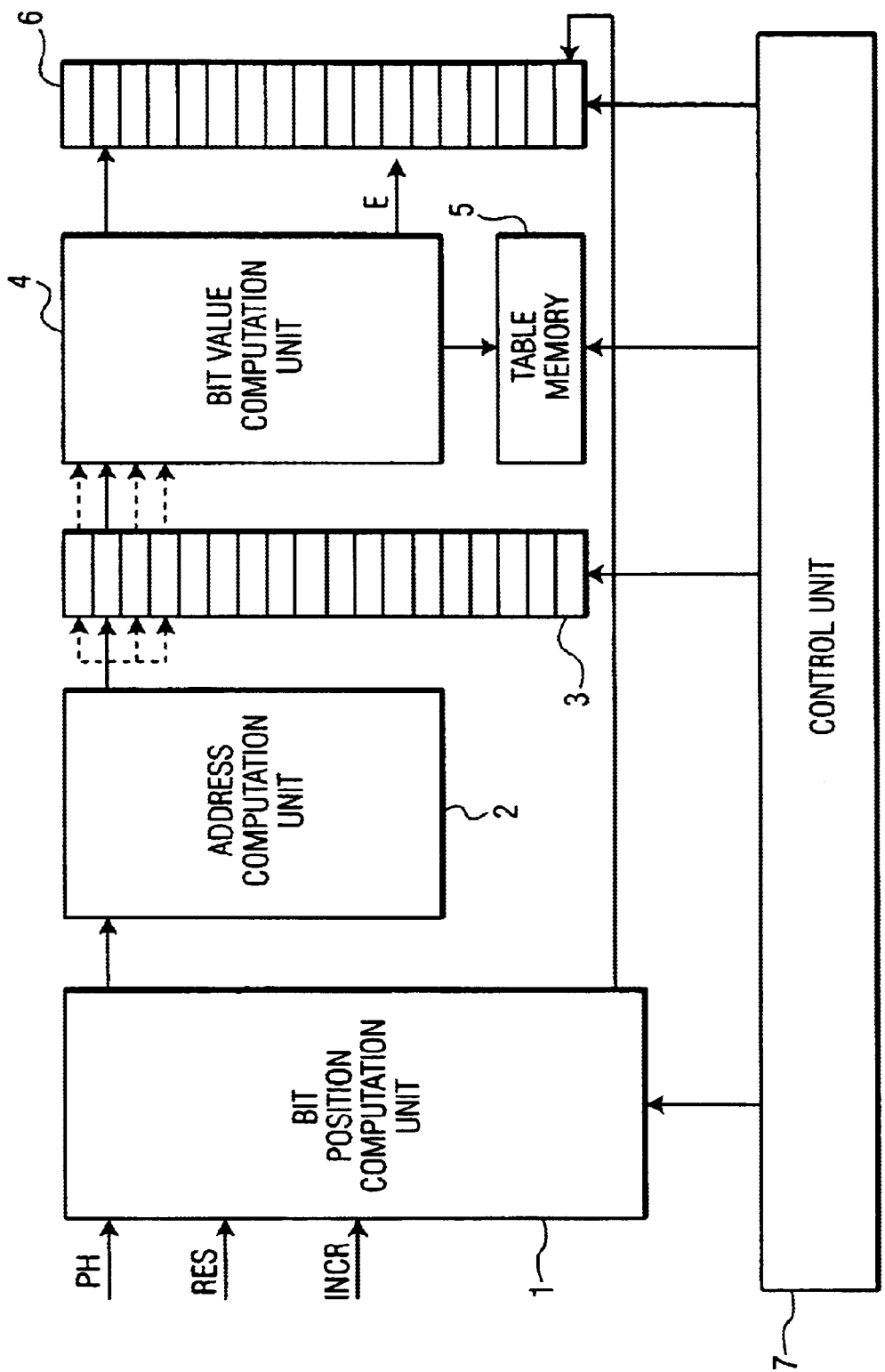
FIG. 2 is a block diagram of an embodiment according to the invention of a system for retrieving data bits of a data signal.

A block diagram of a system according to the invention, shown in FIG. 2, shows a bit position computation unit 1 for computing the bit position. The unit 1 receives a phase signal Ph which indicates, in the manner described above, the phase position of the data bits of the data signal with respect to a predetermined staring point. When the data signal is, for example, a teletext signal, this phase signal indicates the position of the data bits within a picture line.

Moreover, the unit 1 for computing the bit position receives a reset signal Res and an increment signal Incr. The reset signal resets the overall system, which may be done, for example, at the start of each picture line in the case of a teletext signal. The increment signal is a clock signal which predetermines the operating cycle of the system.

The positions of the data bits to be retrieved are determined within the unit 1 for computing the bit position with reference to the phase signal Ph and the known modulation frequency of the data signal. In FIG. 1, these are, for example, the positions of the data bits RP1, RP2 and RP3 to be retrieved.

The unit 1 for computing the bit position passes on these positions to a an address computation unit 2 for computing addresses which determines addresses from the values of the positions. These addresses are related to real sampling values stored in an input buffer memory 3. The unit 2 for computing addresses thus determines, from the signal supplied by the unit 1, those addresses of sampling values in the input buffer memory 3 that may be relevant for retrieving a data bit. By the address signal supplied by the address computation unit 2, the corresponding sampling values are addressed in the input buffer memory 3. The values of these addressed sampling values are passed on to a bit value computation unit 4 for computing the bit value. The unit 4 is the one actually determining the bit values. The unit 4 determines the tolerance windows around the sampling values supplied by the input buffer memory 3 and, as described above, decides whether a sampling value can be directly take over or whether a mean value is computed from two sampling values.

Furthermore, the unit 4 may access threshold values stored in a table memory 5, which values may be adaptively used in such a way that the threshold values are selected in dependence upon the maximum amplitude of the sampling values. Thus, a corresponding clipping level is addressed in dependence upon the actually occurring maximum values of the sampling values in the table. By this clipping level is can then be decided whether the relevant data bit is in a logic first state or in a logic second state.

The unit 4 for computing the bit value is further capable of supplying an error signal E when an insufficient number of data bits is detected, i.e., when either the detection or the data signal is disturbed.

The unit 4 for computing the bit value stores the values of the retrieved bits in an output buffer memory 6, which is addressable by means of the unit 1 for computing the bit position so that the detected, retrieved data bit values are readable from the output buffer memory 6.

Furthermore, a control unit 7 is provided which controls the overall system in such a way that the procedures described above take place in the desired way and sequence.

Both FIG. 1 and FIG. 2 show that the procedure for detecting the data bits to be retrieved is very simple and thus requires a small number of components. In particular, it is also at least partly realizable in software. Even then, it has a high detection security which, moreover, is adjustable within limits by selecting the width of the tolerance windows.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of retrieving a data bit of a data signal in the form of digital sampling values on which the data bit is modulated asynchronously at a known modulation frequency, said method comprising:

receiving a phase signal supplying a phase position of the data bit of the sampled data signal relative to a predetermined starting point;

based on the phase position of the data bit and the known modulation frequency, determining a modulated position of the data bit relative to a sampling position of at least one sampling value within a tolerance window of a predetermined width;

utilizing a first sampling value to retrieve the data bit upon a determination that the modulated position of the data bit is located around a first sampling position of a first sampling value within a first tolerance window of a first predetermined width; and utilizing the first sampling value and a second sampling value to retrieve the data bit upon a determination that the modulated position of the data bit is located between the first sampling position of the first sampling value within the first tolerance window of the first predetermined width and a second sampling position of a second sampling value of a second tolerance of a second predetermined width.

2. The method of claim 1, further comprising:

selecting at least one of the first predetermined width of the first tolerance window and the second predetermined width of the second tolerance window in dependence upon a specific detection security.

3. The method of claim 1, further comprising:

upon the determination that the modulated position of the data bit is located around the first sampling position of the first sampling value within the first tolerance window of the first predetermined width, orienting an amplitude clipping level on a first sampling amplitude of the first sampling value to thereby retrieve the data bit.

4. The method of claim 3, further comprising:

selecting the amplitude clipping level in dependence upon a maximum sampling amplitude of the first sampling value.

5. A method of retrieving a data bit of a data signal in the form of digital sampling values on which the data bit is modulated asynchronously at a known modulation frequency, said method comprising:

receiving a phase signal supplying a phase position of the data bit of the sampled data signal relative to a predetermined starting point;

based on the phase position of the data bit and the known modulation frequency, determining a modulated position of the data bit relative to a sampling position of at least one sampling value within a tolerance window of a predetermined width;

utilizing a first sampling value to retrieve the data bit upon a determination that the modulated position of the data bit is located around a first sampling position of a first sampling value within a first tolerance window of a first predetermined width;

utilizing a supporting value to retrieve the data bit upon a determination that the modulated position of the data bit is located between the first sampling position of the first sampling value within the first tolerance window of the first predetermined width and a second sampling position of a second sampling value of a second tolerance of a second predetermined width, wherein the supporting value is formed from the first sampling value and the second sampling value.

6. The method of claim 5, further comprising:

selecting at least one of the first predetermined width of the first tolerance window and the second predetermined width of the second tolerance window in dependence upon a specific detection security.

7. The method of claim 5, further comprising:

orienting an amplitude clipping level on an amplitude of the supporting value to thereby retrieve the data bit.

8. The method of claim 7, further comprising:

selecting the amplitude clipping level in dependence upon a maximum sampling amplitude of the first supporting value.

9. A method of retrieving a data bit of a data signal in the form of digital sampling values on which the data bit is modulated asynchronously at a known modulation frequency, said method comprising:

receiving a phase signal supplying a phase position of the data bit of the sampled data signal relative to a predetermined starting point;

based on the phase position of the data bit and the known modulation frequency, determining a modulated position of the data bit relative to a sampling position of at least one sampling value within a tolerance window of a predetermined width; and upon a determination that the modulated position of the data bit is located around a first sampling position of a first sampling value within a first tolerance window of a first predetermined width, orienting a first amplitude clipping level on a first sampling amplitude of the first sampling value to thereby retrieve the data bit.

10. The method of claim 9, further comprising:

selecting the first predetermined width of the first tolerance window in dependence upon a specific detection security.

11. The method of claim 9, further comprising:

selecting the first amplitude clipping level in dependence upon a maximum sampling amplitude of the first sampling value.

12. The method of claim 9, further comprising:

forming a supporting value from the first sampling value and a second sampling value upon a determination that the modulated position of the data bit is located between the first sampling position of the first sampling value within the first tolerance window of the first predetermined width and a second sampling position of a second sampling value of a second tolerance of a second predetermined width; and orienting a second amplitude clipping level on a supporting amplitude of the supporting value to thereby retrieve the data bit.

13. The method of claim 12, further comprising:

selecting at least one of the first predetermined width of the first tolerance window and the second predetermined width of the second tolerance window in dependence upon a specific detection security.

14. The method of claim 12, further comprising:

selecting the first amplitude clipping level in dependence upon a maximum sampling amplitude of the first sampling value.

15. The method of claim 12, further comprising:

selecting the second amplitude clipping level in dependence upon a maximum sampling amplitude of the second sampling value.

16. The method of claim 12, wherein the first amplitude clipping level and the second amplitude clipping level are equal.

* * * * *